United States Patent [19]

Lotzgesell

[11] 3,876,629

[45] Apr. 8, 1975

[54] TEMPERATURE STABLE GRANULAR STARCH PRODUCT

[75] Inventor: James A. Lotzgesell, Decatur, Ill.

[73] Assignee: A. E. Staley Manufacturing Company, Decatur, Ill.

[22] Filed: Apr. 25, 1974

[21] Appl. No.: 464,084

Related U.S. Application Data

[63] Continuation-in-part of Ser. No. 337,182, March 1, 1973, abandoned.

[52] U.S. Cl.. 260/233.3 R; 260/233.3 A; 260/233.5
[51] Int. Cl. ............................................. C08b 19/06
[58] Field of Search.... 260/233.3 A, 233.3 R, 233.5

[56] References Cited
UNITED STATES PATENTS

| | | | |
|---|---|---|---|
| 3,238,193 | 3/1966 | Tuschhoff et al. | 260/233.3 R |
| 3,422,088 | 1/1969 | Tuschhoff et al. | 260/233.3 R |
| 3,719,661 | 3/1971 | Robinson et al. | 260/233.3 R |

*Primary Examiner*—Melvyn I. Marquis
*Attorney, Agent, or Firm*—Howard J. Barnett; Charles J. Meyerson

[57] ABSTRACT

Starch in granule form, more particularly large cereal starch granules obtained from hydrocyclone separation of a prime grade wheat starch slurry, are crosslinked with phosphorus oxychloride under highly alkaline conditions in an aqueous suspension to raise the gelatinization temperature of the starch granules. The crosslinked starch granules so obtained have substantially improved heat stability, and can be used in carbonless paper coating processes which operate at a temperature up to about 160°F., which is more than 20°F. higher than the normal gelatinizing temperature of the untreated starch, but lower than the gelatinizing temperature of the crosslinked starch granules. The crosslinking reaction is commenced slowly with an initial controlled addition of phosphorus oxychloride at a pH of at least 11.5 and at a high titer which is increased substantially during the reaction by the controlled simultaneous addition of sodium hydroxide and phosphorus oxychloride. No added gelatinization inhibitors are required because the initial crosslinking stabilizes the starch and inhibits gelatinization. The treated large granules range in size from 12 to 40 microns, and the initial pasting temperature is raised from about 135°F. to about 162°F. which is completely adequate for the paper coating process described. The crosslinking method here described can also be used to increase the pasting temperature of other starches, including corn, waxy maize, sorghum, rice, rye, barley, potato, tapioca or sago starch. Rye and barley, in particular, can also be size classified by means of hydrocyclone separation so that the crosslinked, large granule, temperature stable product so obtained can be used in carbonless paper coatings to replace the much more scarce arrowroot starch granules formerly used.

44 Claims, No Drawings

TEMPERATURE STABLE GRANULAR STARCH PRODUCT

This application is a continuation-in-part of Ser. No. 337,182, filed Mar. 1, 1973 and now abandoned.

BACKGROUND OF THE INVENTION

Certain cereal starches have a characteristic particle size distribution which facilitates particle size classification into a large granule portion and a small granule portion by hydrocyclonic techniques, the cereal starch being in aqueous suspension. Barley, rye and wheat starch may be separated into large granule portions by this method, and then the large granules may be further modified to obtain specific properties desired, such as improved heat stability by crosslinking the starch with phosphorus oxychloride to increase the gelatinization temperature.

Prime grade, native wheat starch slurry is preferred for this hydrocyclonic separation technique because it is available in quantity, and it is possible to obtain a large granule wheat starch having granules ranging in size from 12 to 40 microns. Of these large wheat starch granules, about 22% or more of the granules are at least 22 microns. The large granule starches thus obtained are an excellent replacement for scarce arrowroot starch, especially in those applications where the matching of the arrowroot ganule size is important. These large granule starches perform well in anti-offset lithograph powders, and they serve as protective particles used to facilitate handling of pressure sensitive surface coatings containing frangible microencapsulated fluids. An example of the latter is non-carbon duplicating paper in which the duplicating ink is microencapsulated as a coating on the copy paper surface.

The normal gelatinization temperature of the large granule cereal starch limits the coating process temperature which may be used, while still retaining intact granules. If the gelatinization temperature is exceeded, the granules rupture, and no longer can be used in paper coatings to provide effective handling protection for microencapsulated fluids on carbonless paper, and other microcapsule surface coatings.

In co-pending application Ser. No. 180,588 filed Sept. 15, 1971 and now abandoned, size classification of starch granules is described. Raising the pasting temperature by means of crosslinking with epichlorohydrin and urea formaldehyde is also described. In that application, prime grade, washed wheat starch slurry at a very specific viscosity is separated into a large granule fraction in a hydrocyclone system comprising a series of interconnected hydrocyclone units. The underflow from the apex opening of a first hydrocyclone is primarily a partially separated, aqueous suspension of large granule wheat starch. The viscosity of this partially separated underflow is again adjusted very carefully, and the underflow is fed into a second hydrocyclone. The underflow from the second hydrocyclone comprises a large granule wheat starch having particle sizes in the range of 12 to 40 microns. The pasting temperature for this unmodified large granule wheat starch is about 138°F.

DESCRIPTION OF THE PRIOR ART

Although it has been known that the stability of gelatinized starch pastes can be improved to some extent by crosslinking, and that granule swelling can be inhibited, it was not known what effect crosslinking would have on size classified starch granules, nor was it known that crosslinking could be carried out at high pH values in the absence of an added gelatinization inhibitor such as sodium sulfate or amphoteric salts, such as sodium silicate. In a typical wheat starch suspension, gelatinization was generally observed to take place over a range of temperatures, with swelling and loss of birefringence occurring first in the large granules. Pomeranz, Y., WHEAT: Chemistry and Technology, Am. Assn. Cereal Chemists, St. Paul, Minn. (1971) p.344. There was no size classification disclosed in the above publication, and it was not known what effect the hydrocyclone size classification would have on the bahavior of the large granule wheat starch.

Crosslinking with $POCl_3$ is described in U.S. Pat. No. 3,238,193, assigned to a common assignee herewith. That patent describes the use of $POCL_3$ at a somewhat elevated temperature (100°F.) at a pH of 10.2. Sodium carbonate was used to obtain the mildly alkaline pH for the reaction. In another example, a small amount of sodium hydroxide was used in addition to sodium carbonate to obtain an unspecified pH condition. In both of the above examples, the pasting temperature of the crosslinked starch was actually *lower* than that of the unmodified corn starch from which the crosslinked starches were made (see Table III of patent). The same elevated reaction temperature was used in another example, in which the reaction pH was 11.0. In this example, the pasting temperature did actually increase about 5°F. As with the other examples, the crosslinking reaction was stopped by the addition of vinyl acetate which decreased the pH into the acid range. There is no disclosure here of a $POCl_3$ crosslinking reaction conducted at a pH of more than 11.5 at room temperature without added buffering or gelatinization inhibiting salts, and in which the pasting temperature of the granular product is increased more than 20°F.

U.S. Pat. No. 3,437,493 also describes $POCl_3$ crosslinking; however, the crosslinking is accomplished at a pH of about 6.5 and at a temperature which gelatinizes the starch (200°F.). Such a product is, of course, not useful where the granular properties are needed.

SUMMARY OF THE INVENTION

This invention is directed to a size classified, crosslinked large granule cereal starch, particularly size classified wheat starch having granule sizes averaging from 12 to 40 microns in size, with about 22% of the granules at least 22 microns in size. The crosslinking is obtained using phosphorus oxychloride in an aqueous suspension of the large granular starch under highly alkaline conditions at a pH in the range of at least 11.5, without added buffering or gelatinization inhibiting salts. The reaction temperature may be from about 70°F. up to about 105°F., preferably below 90°F., and the concentration of the aqueous starch suspension is preferably in the range of 20°–23° Baume, although it may vary over a relatively wider range. The gelatinization temperature (hot stage method) of the large granule starch prior to the crosslinking reaction is about 138°F., and after the reaction the gelatinization temperature is increased to about 162°F.

DETAILED DESCRIPTION OF THE INVENTION

The following detailed example will illustrate the best mode presently contemplated for carrying out the invention. The separation of wheat starch into a large granule fraction is described in more detail in U.S. patent application Ser. No. 180,588 filed Sept. 15, 1971 and now abandoned. For the purposes of this application, it is sufficient to state that a large granule wheat starch having granule sizes from 12 to 40 microns, with about 22% of the granules at least 22 microns in size is crosslinked with phosphorus oxychloride under highly alkaline conditions without added gelatinization inhibitors to obtain the temperature stable, crosslinked large granule starch of the invention.

The following example illustrates more specifically the close correlation between the maintenance of the reaction alkalinity and the phenolphthalein titer tests as a means of monitoring the suspension alkalinity and indicating whether more phosphorus oxychloride can be added, or whether sodium hydroxide should be added first to keep the crosslinking reaction within the desired highly alkaline pH range.

menced, while holding the pH in the range of 11.5–11.7 by monitoring the alkalinity with titer tests and controlling pH with NaOH additions as needed. The temperature for this addition was kept at 90°F. or less, preferably about 76°F.

It is contemplated that other strongly alkaline bases can be used instead of sodium hydroxide. Such a list includes potassium hydroxide, lithium hydroxide, and, to a lesser extent, calcium hydroxide. At the present time, cost and efficiency make sodium hydroxide the preferred alkali.

As noted in Table I below, after the last POCl$_3$ addition is made, the suspension is neutralized with an acid, such as sulfuric, hydrochloric or nitric acid in the conventional manner, taking care to preserve the discrete, particulate structure of the crosslinked starch granules. The approximate procedure for the simultaneous additions of alkali (NaOH) and crosslinker (POCl$_3$) as followed in Example I is shown in Table I below:

TABLE I

| time (min.) | POCl$_3$ Addition Amt.(gms). | pH | NaOH Addition, 8.9° Be. Amt (ml) | pH | Titer(10 ml) | Temp(°F.) |
|---|---|---|---|---|---|---|
| 0 | 19.3(11.5 ml) | 11.9 | | | | |
| 3 | ↓ | | 390 | 11.7 | — | 87 |
| 7 | (Stopped) | 11.65 | ↓ | | | |
| 9 | | | (Stopped) | 11.7 | 16.1 | 87 |
| 19 | | | 42 | | | |
| 22 | | | (Stopped) | 11.8 | | 86 |
| 92 | 12.5(7.5 ml) | 11.85 | ↓ | | 18.0 | 89 |
| 93 | ↓ | | 250 | 11.8 | | 89 |
| 95 | (Stopped) | 11.75 | ↓ | | | |
| 97 | | | (Stopped) | | 19.1 | |
| 110 | | | 81 | 11.85 | | 87 |
| 113 | | | (Stopped) | 11.95 | 22.4 | 85 |
| 122 | 12.5(7.5 ml) | 12 | | 12.0 | | |
| 125 | (Stopped) | 11.8 | | | | |
| 137 | | 11.35 | | | | |
| 142 | | 11.3+ | | | | |
| 147 | | 11.3+ | | | 11.0 | 87 |
| 152 | added 61 ml 29.5° Be. H$_2$SO$_4$ | 5.6 | | | | |

EXAMPLE I

One thousand grams, dry substance basis, of wheat starch granules was first suspended in 1450 ml. of water at 81°F. To obtain improved whiteness of the granules, this suspension was bleached by adding 3 gms. Cl$_2$ in the form of 30 ml. of 6.6 titer NaOCl, and reacting for 1.5 hrs. The pH of the suspension was increased from 9.2 to 11.7 with 165 ml. of 8.9° Be. NaOH. The 10 ml. titer at this point was 10.8 ml. using 0.1N HCl. After attaining the higher pH, 5.7 grams (3.4 ml.) of POCl$_3$ was added, and allowed to react for about ½ hour. The pH after the initial POCl$_3$ addition dropped to 10.8 (10 ml. starch suspension, 3.8 ml. titer of 0.1N HCl), and was again increased to 11.9 with about 208 ml. 8.9° Be. sodium hydroxide. The 10 ml. titer then was 16.3 ml., using 0.1N HCl. The "titer" in this case is the amount of 0.1N HCl in milliliters required to change the color from reddish to clear of 10 milliliters of starch suspension (to which phenolphthalein has been added to give a reddish color).

At this point, which is approximately 50 minutes after the initial sole POCl$_3$ addition, the simultaneous addition of sodium hydroxide and POCl$_3$ is commenced As can be seen, the main, simultaneous addition portion of the reaction took a total time of about 2½ hours. This compares to a reaction time of about 18 hours for the conventional epichlorohydrin crosslinking reaction. It should also be noted that throughout the last 2½ hours of the reaction, the pH never fell below 11.7, and the 10 ml. titer was maintained above 16 ml., and was actually increased up to about 20 ml. until just prior to the last addition of POCl$_3$. The crosslinking reaction was stopped by the addition of sulfuric acid. POCl$_3$ crosslinking is almost instantaneous, only the controls needed limit the reaction speed.

The above example demonstrates that the titration monitoring technique provides a positive means for controlling the true alkalinity level of the reaction to insure the required high degree of crosslinking, and to consistently obtain the desired increase in granule pasting temperature. The pH level remained relatively constant at about 11.5 throughout the reaction, but the titer levels increased steadily, and this was accomplished by the controlled addition of sodium hydroxide. The titer is the minimum amount of volume required to bring about a given result in titration. In this example, a 10 ml. sample of phenolphthalein colored (reddish)

starch suspension is used, and a measured amount in milliliters of 0.1N HCl is added to the suspension until the phenolphthalein indicator just fails to give a reddish color to the starch suspension. Such a test is a true indication of alkalinity.

The normality (gram-molecular weight per titer of solution) of an unknown solution can be determined by titration of a given portion of the solution of unknown normality with a solution of known normality to an end-point. An indicator, such as phenolphthalein is added to the solution of unknown normality. A change in color occurs at the end-point. In an alkaline solution, phenolphthalein produces a red solution which goes colorless when titrating alkaline solution with an acid of known normality. In actual practice, a measured volume of the solution of unknown normality is titrated to an end-point. The volume of the solution of known normality required to reach the end-point is called the *titer*. The normality of the unknown can be calculated by — (Vol. X Normality) $V_1N_1 = V_2N_2$ (Vol. X Normality).

In this method, 10 ml. of phenolphthalein tinted starch slurry is used (designated $V_1$). $V_1$ is titrated with 0.1N HCl (hydrochloric acid) to a phenolphthalein end-point. If 11.7 ml. of the 0.1N HCl is needed to reach the end-point, the *titer* of the 10 ml. of starch slurry is 11.7 ml. (0.1N HCl).

The calculations of the normality of the starch slurry is then:

| STARCH | | ACID |
|---|---|---|
| 10.0 ml. × $N_1$ | = | 11.7 ml. × 0.1N |
| $N_1$ | = | $\frac{11.7 \text{ ml.} \times 0.1N}{10.0 \text{ ml.}}$ |
| $N_1$ | — | .117 (normal) |

It should be noted that no gelatinization inhibiting salt is added to the crosslinking reaction as in prior art methods. It has been found that such addition can be eliminated by the reaction method set forth.

The method here described is believed to avoid gelatinization even at such high alkalinity levels because the crosslinking reaction is initially commenced cautiously at room temperature (below about 95°F.) and the crosslinking builds up the resistance of the starch to pasting in alkali as the reaction progresses, and the alkalinity of the suspension may be progressively increased. As the reaction salts build up, they interfere with accurate pH measurements, but the titer method of monitoring and controlling the reaction alkalinity remains accurate and reliable.

The initial addition of $POCl_3$ is sufficient to stabilize the granules, and inhibit pasting even at highly alkaline pH without the addition of inhibiting salts, such as sodium sulfate, as was found to be necessary when epichlorohydrin is used. The product resulting from the above reaction was filtered and dried, and alkali fluidity determinations were made. When 18 gms. (dsb) of the $POCl_3$ crosslinked starch product is pasted with 25 ml. water, 80 ml. of 2N NaOH, the alkali fluidity for the solution was 92 ml. When 20 gms. (dsb) of the product was pasted with 30 ml. water and 70 ml. of 2N NaOH, the alkali fluidity was 74.5.

The phosphorus oxychloride crosslinked starch derivative of the invention is ideally suited for use as a component of carbonless duplicating paper because the crosslinking reaction increases its pasting temperature. The higher resistance to heat due to the phosphorus oxychloride crosslinking makes it possible to use this product in the carbonless paper coating process using higher temperature infra-red heating means for drying the coating. The starch granules of the subject invention can easily withstand temperatures up to about 160°F., and even higher, which allows this product to be used in coatings on carbonless paper in which the processing temperatures can reach 160°F. Until now, only the much more scarce arrowroot starch could be used in the coating processes which require the starch granules to remain intact at these higher temperatures.

The following example illustrates the method of making the product in large, commercial quantities using slurry titer as the main method of controlling the additions of $POCl_3$ and NaOH.

EXAMPLE II

Twenty thousand pounds of the above described large granule wheat starch was slurried at 19°–22° Be., and 60 pounds of chloride was added as a 9.4 titer bleach, and the mixture was reacted at ambient temperature (at 40°C.) for about 2 hours. Twelve hundred gallons of 3% (4.5° Be.) sodium hydroxide (250 pounds d.s.b.) was then added to adjust the slurry alkalinity. The alkali addition was made at a rate of about 20 gallons per minute until 10 milliliters of slurry required 10.5–11.5 milliliters of 0.1N HCl to titrate phenolphthalein to the end point.

About 120 pounds of phosphorus oxychloride was then added separately (without sodium hydroxide), until 10 milliliters of slurry required 7–9 milliliters of 0.1N HCl to titrate phenolphthalein to the end-point. Care must be taken during this addition, since phosphorus oxychloride is extremely reactive. Respiratory equipment, such as a Scott air pack, should be used to protect the operator from dangerous vapors. Rubber gloves should also be worn by the operator handling the chemicals. The slurry should be maintained at least slightly alkaline throughout the reaction. The higher alkali levels disclosed ensure efficient $POCl_3$ use.

One thousand gallons of 6 percent sodium hydroxide (300 pounds sodium hydroxide, d.s.b.) was next added to the slurry to adjust the alkalinity to a 11.5–12.5 ml. titer, using phenolphthalein and 0.1N hydrochloric acid (HCl). Experience indicates that about 300 pounds of sodium hydroxide (dry substance basis) is required.

The sodium hydroxide (6% solution) and phosphorus oxychloride were added simultaneously, but separately, to the reaction mixture. When the remaining 6% sodium hydroxide was depleted, 10% sodium hydroxide was used. The sodium hydroxide was added at a rate of approximately 15 gallons per minute. One thousand four hundred eighty pounds of phosphorus oxychloride was added at a rate to keep the slurry titer at about the following figures. Slurry titer is measured every 10 minutes.

| Pounds $POCl_3$ | Slurry titer in ml. (0.1N HCl) |
|---|---|
| 100 | 12.0–14.0 |
| 200 | 13.5–15.5 |
| 300 | 15.0–17.0 |
| 400 | 16.5–18-5 |
| 500 | 18.0–20.0 |
| 600 | 19.5–21.5 |
| 700 and above | 20.0–22.0 |

If the titer is high, the rate of addition of sodium hydroxide is decreased. If the titer is low, then the rate of addition of sodium hydroxide is increased.

After the 1480 pounds of phosphorus oxychloride had been added, the addition of sodium hydroxide was stopped. Then POCl₃ only was added in an amount of about 200 pounds to reduce the titer to 12–15 ml.

After 10 minutes, the alkali fluidity was then measured according to the following procedure:

A half gallon of slurry was adjusted to a pH of 4–7 with 20° Be. hydrochloric acid. The starch cake sample to be tested was first filtered and washed with one quart of water, then 500 grams of the starch cake was reslurried in 280 ml. of water at 75°–80°F., and adjusted to 19.5°–20.5° Be. with additional starch cake or water at about 75°–80°F. The slurry sample containing 20 grams dry substance starch was placed in a fluidity beaker, and 70 ml. of 2.0N NaOH was added. The mixture was stirred for 3 minutes and immediately after stirring, an alkali fluidity reading was taken using a standardized fluidity funnel. The fluidity funnel used should have a "water-time" between about 30 to 40 seconds. Water-time is the total elapsed time required to pass 100 ml. of pure water through the fluidity funnel, and is checked before the beginning of each test.

To conduct the alkali fluidity test, the alkaline starch suspension is placed in the fluidity funnel and the amount of starch solution which flows through the funnel during the water-time is measured and recorded in milliliters. The funnel is thoroughly washed prior to each test to insure accurate observations.

The alkali fluidity test is presently believed to be the most practical means for controlling the degree of crosslinking of the starch. The test is generally described in U.S. Pat. No. 3,238,193 at columns 7 and 8, lines 40–61 and 1–9 respectively. The basic principle followed is to compare the fluidity of the sample to the fluidity of water as a standard. There are, of course, variations in the particular starch sample concentrations, and only samples of the same starch concentration can be directly compared to each other. For example, if a starch sample is quite thick when pasted, a smaller amount will be used in proportion to the amount of water it is mixed with so that a middle or higher than middle range figure will be obtained (50 ml. or more, up to about 90 ml.).

The fluidity funnel used for the alkali fluidity tests described herein comprises two main parts, a funnel body and a funnel tip threadably attached thereto. A simple plunger-type, tapered valve on a glass stem can be used to manually control flow through the funnel orifice. The funnel parts are precision-machined from stainless steel stock, and polished to very smooth surfaces on all parts which come in contact with the test samples.

The funnel body defines a generally cone shaped vessel having a sixty degree angle (or taper) between opposite, converging funnel walls. Funnel body height is sufficient to hold at least a 100 ml.sample, and a 0.277 inch orifice and fluid passage is provided at the narrowest portion of the funnel for attachment to the funnel tip. The fluid passage is 1½ inches in length from the orifice to the narrow end of the funnel body. The opposite, wide orifice of the funnel body is oriented upwardly, and the tapered valve is inserted downwardly from above into the smaller orifice during the tests. Operation of this valve against the water-time of the funnel gives the test readings. The funnel tip is a cup shaped member, which is threadably received on the narrow end of the funnel body. The internal chamber of the funnel tip is hemispherical and has a 3/16 inch diameter with a lower central opening of 0.070 inch which is 0.0492 inches in length. The total height for the lower end of the funnel body passage to the lower external orifice of the funnel tip includes the height of the ball chamber (0.1008 inches) and the length (0.0492 inches) of the funnel tip opening.

The pasting temperature is determined at this point in the process, according to the following procedure. The method used is generally described in the following publication: Schoch, et al. *Microscopic Examination of Modified Starches*, Analytical Chemistry 28: 382–387 (1956). In this method, a Kofler electrically heated microscope stage is used to heat a drop of an 0.1–0.2% suspension of the starch on a microscope slide. The heating rate is adjusted to about 2°C. per minute, and the granules are observed during the heating with normal and with polarized light. Using normal light, the pasting of a granule can be noted by the change in shape and size as it begins to swell. The loss of birefringence evidenced by the loss of the polarization cross is observed with polarized light. The granules paste over a range of temperature, and the temperature at the instant when 50% of the granules in the field of the microscope are estimated to have lost their polarization crosses is recorded, and is defined as the pasting temperature for purposes of this test.

The alkali fluidity should be at least 75 ml., and the pasting temperature should be at least 140°F. for the process to be terminated. If either the alkali fluidity or the pasting temperature is below these values, the slurry alkalinity is adjusted to a 16–18 ml. titer with 10% sodium hydroxide (about 360 pounds sodium hydroxide, dry substance, will be required). Then about 200 pounds phosphorus oxychloride (without caustic) is added. The slurry is then adjusted to 5.3–5.6 pH with 60° Be. sulfuric acid (about 1200 pounds required). This pH adjustment step is performed even if it was not necessary to add addition NaOH and POCl₃ as described above, to further increase the alkali fluidity and pasting temperature.

The slurry is then screened through a 60 mesh screen on a shaker, and filtered with maximum wash. The filtered starch is then dried to 8–12% moisture, and ground. The ground starch product comprises phosphorus oxychloride crosslinked starch granules ranging in size from 12 to 40 microns with at least 22% of the granules being 22 microns or larger. The pasting temperature of the washed, crosslinked product is at least 160°F., as compared to 138°F. prior to the above described crosslinking reaction.

The product so obtained can be used as a protective material in carbonless paper coatings in which the coating process requires exposure of the starch granules to excessive heat. The crosslinked granules will withstand a temperature of 90°C. (at 194°F.) for up to 40 minutes. The improved heat stability makes this product well suited for use in the high temperature coating process for making carbonless duplicating paper. Use of this heat stable, crosslinked, large granule starch eliminates the smudging problem found when a less heat stable, large granule starch was used on the high temperature paper coater.

The derivatized starch of this invention provides an economical replacement for arrowroot starch granules. This relatively less expensive and more readily available wheat starch granule performs well under the same processing conditions as arrowroot starch.

It is believed this invention is generally useful on the following starches derived from cereal grains including wheat, rye, rice, waxy rice, barley, oats, milo, waxy milo, corn, genetic varieties of corn including waxy maize and high amylose corn; varieties of pea, including field pea and wrinkled pea; arrowroot, potato, sweet potato, sago, tapioca and taro.

In summary, this invention is directed to a $POCl_3$ crosslinked, granular starch which has a substantially higher than usual pasting temperature, obtained by a stepwise, controlled alkalinity reaction in which minor amounts of a strong alkali and $POCl_3$ are first added in controlled amounts to stabilize the starch granules against pasting when major alkali additions are subsequently made. The initial alkalinity level indicated by a titer of measured of a 10 ml. slurry sample using 0.1N HCl and phenolphthalein indicator may measure as low as 10 ml. after the initial alkali addition, and it may decrease to a fraction above neutral upon making the initial $POCl_3$ addition. The crosslinking reaction stops below this level (about pH 7), and although the crosslinking reaction can be continued fairly well when titers from 10–23 ml. are maintained, for better reaction efficiency, it is desirable to increase the alkalinity gradually to the upper end of the range, but using caution to avoid pasting the starch granules and causing them to lose their discrete particulate structure.

Various modes of carrying out the invention are contemplated and are believed to be within the scope of the following claims.

What is claimed is:

1. A phosphorus oxychloride crosslinked starch in granular form having a pasting temperature at least 12°F. higher than the pasting temperature of the starch prior to crosslinking, said starch being manufactured by a process comprising preparing a suspension of a granular starch, adding to said suspension an amount of an alkali material selected from the group consisting of sodium hydroxide, potassium hydroxide, lithium hydroxide and calcium hydroxide in an amount sufficient to impart to said suspension a first degree of alkalinity wherein the suspension has a pH of above about 11.5 and in which 10 ml. of starch suspension will produce a titer between 10 ml. and 13 ml. of 0.1N HCl using phenolphthalein indicator and below that degree of alkalinity at which the starch granules lose their discrete particulate structure, partially crosslinking said starch with phosphorus oxychloride to a degree sufficient to initially inhibit said starch, terminating said crosslinking before the pH of said suspension falls below neutral and to maintain the titer with 0.1N HCl and phenolphthalein on the alkaline side, adding to said suspension a further amount of alkali material selected from the group consisting of sodium hydroxide, potasium hydroxide, lithium hydroxide and calcium hydroxide in an amount sufficient to provide a second degree of alkalinity wherein the suspension has a pH above about 11.5 and a titer above about 10 ml. to 23 ml., but below that at which the starch granules lose their discrete particulate structure, further crosslinking said partially crosslinked starch with phosphorus oxychloride while maintaining and gradually increasing the titer of said suspension from about 10 ml. to about 23 ml. by the addition of an alkali material selected from the group consisting of sodium hydroxide, potassium hydroxide, lithium hydroxide and calcium hydroxide during said crosslinking, and maintaining the temperature throughout said crosslinking below that temperature at which the starch granules lose their discrete particulate structure.

2. The crosslinked starch of claim 1 in which the starch is derived from the group consisting of starches derived from cereal grains including wheat, rye, rice, waxy rice, barley, oats, milo, waxy milo, corn, genetic varieties of corn including waxy maize and high amylose corn; varieties of pea, including field pea and wrinkled pea, arrowroot, potato, sweet potato, sago, tapioca and taro.

3. The crosslinked starch of claim 1 in which the starch is prime grade wheat starch and the pasting temperature is raised from about 138°F. to about 162°F. by means of $POCl_3$ crosslinking the starch.

4. The crosslinked starch of claim 3 in which the wheat starch granules have been subjected to hydrocyclone separation so that substantially all granules are in the range of 12 to 40 microns in size.

5. The crosslinked starch of claim 4 in which at least 22% of the granules are at least 22 microns in size.

6. A method of increasing the pasting temperature of a granular cereal starch approximately 20°F., the steps comprising preparing a suspension of said granular cereal starch in water at a temperature below about 105°F., adding a strong alkali selected from the group consisting of sodium hydroxide, lithium hydroxide, potassium hydroxide and calcium hydroxide to said suspension in an amount sufficient to obtain a pH of at least about 11.5 and below the alkalinity level at which the starch granules lose their discrete particulate structure, adding a minor amount of phosphorus oxychloride to said suspension to initiate crosslinking of said granular cereal starch, allowing said crosslinking to continue for up to about ½ hour to initially inhibit the starch to prevent pasting of the starch when later, larger additions of said strong alkali are made, readjusting the pH of said suspension up to above 11.5 with said alkali, then adding phosphorus oxychloride and a strong alkali selected from the group consisting of sodium hydroxide, lithium hydroxide, potassium hydroxide and calcium hydroxide in amounts to maintain the pH of said suspension in the range of at least about 11.5 and below the alkalinity level at which the starch granules lose their discrete particulate structure, and permitting the crosslinking reaction to continue for up to about two and one-half hours at a temperature below about 105°F., then neutralizing and isolating said starch to obtain a crosslinked granular cereal starch having a pasting temperature about 20°F. higher than the original pasting temperature of said granular cereal starch.

7. The method of claim 6, in which the granular cereal starch is taken from the group consisting of corn, waxy maize, sorghum, rice, wheat, rye and barley starches.

8. The method of claim 6, in which the granular cereal starch is prime grade wheat starch, and the temperature throughout the crosslinking reaction is maintained below about 95°F.

9. The method of claim 8, in which the wheat starch comprises granules ranging in size from 12 to 40 microns.

10. A method of crosslinking a granules starch to increase the gelatinization temperature, the steps comprising:
   a. preparing an aqueous suspension of said starch at a temperature below about 105°F.;
   b. adding sufficient aqueous strong alkali to said suspension to raise the alkalinity to a level at which the phenolphthalein titer for a 10 ml. sample using .1N HCl is at least about 10-12 ml., at which point the sample is observed to change from reddish to clear;
   c. then adding up to about 1% $POCl_3$ based on the starch dry substance weight to initially crosslink and inhibit said starch, continuing said crosslinking reaction until the phenolphthalein titer of a 10 ml. sample of said reaction mixture suspension using .1N HCl remains constant at about 7-9 ml.,
   d. next adding sufficient alkali to raise the alkalinity to a level at which the phenolphthalein titer for a 10 ml. sample using .1N HCl is about 11-15 ml.;
   e. then adding up to about 4% $POCl_3$ based on the weight of the starch dry substance while also making carefully controlled additions of strong alkali to maintain the alkalinity of said aqueous suspension at a level at which the phenolphthalein titer of a 10 ml. sample using 0.1N HCl is above about 11 ml. and then gradually increasing the level of alkalinity up to no higher than that at which a 10 ml. sample using 0.1N HCl will be about 25 ml.;
   f. after attaining a final higher alkalinity level at which the titer for a 10 ml. sample using 0.1N HCl is from above 11 ml. up to no more than about 25 ml., then adding sufficient $POCl_3$ to decrease the alkalanity level to a level at which a 10 ml. sample using 0.1N HCl will be about 10-13 ml.;
   g. neutralizing said aqueous suspension to a pH of about 5-7; and
   h. isolating a granular, crosslinked starch having a hot stage pasting temperature at least 20°F. higher than the granular starch prior to crosslinking, and having an alkali fluidity for a 20 gm. dry substance sample in 70 ml. of 2N NaOH of 70 ml. or higher.

11. The method of claim 10, in which the strong alkali is NaOH, the starch is a large granule wheat starch having granule sizes ranging from 12 to 40 microns, and the initial hot stage pasting temperature of the granular starch is about 138°F. and the hot stage pasting temperature of the crosslinked granular starch is about 160°F.

12. The method of claim 10, in which the granular starch is selected from the group consisting of size classified wheat, rye and barley starches having granule sizes ranging from 12-40 microns.

13. The method of claim 10, in which the granular starch is prime grade, size classified wheat starch having substantially all granules in the size range of 12 to 40 microns, and at least 22% of the granules are at least 22 microns in size.

14. The method of claim 10, including the step of adding sufficient alkali to raise the phenolphthalein titer to about 16-25 ml. and then adding an additional small amount of $POCl_3$ to obtain additional crosslinking and further increase the hot stage pasting temperature of said crosslinked granular starch.

15. The method of claim 10, in which the alkali is NaOH, and in which about 8-14% NaOH, based on the weight of the starch dry substance, is added simultaneously but separately with about 4-7% $POCl_3$ based on the weight of the starch dry substance.

16. The method of claim 14, in which the alkali is NaOH, and about 1.8-2% NaOH is added based on the weight of the starch, dry substance.

17. A crosslinked granular starch having a pasting temperature at least 20°F. higher than the pasting temperature of the starch prior to crosslinking, said starch being obtained by:
   a. preparing an aqueous suspension of said starch at a temperature below about 100°F.;
   b. adding sufficient aqueous strong alkali to said suspension to raise the phenolphthalein titer for a 10 ml. sample to said suspension using 0.1N HCl to about 10-12 ml., at which point the sample is observed to change from reddish to clear;
   c. then adding up to about 1% $POCl_3$ based on the starch dry substance weight to initially crosslink a portion of said starch, continuing said crosslinking reaction until the phenolphthalein titer of a 10 ml. sample of said reaction mixture suspension using 0.1N HCl remains constant;
   d. next adding sufficient strong alkali to increase the phenolphthalein titer for a 10 ml. sample using 0.1N HCl up to 11-13 ml.;
   e. then adding up to about 4% $POCl_3$ based on the weight of the starch dry substance while also making carefully controlled additions of strong alkali to attain an increased alkalinity level and controlling said increased alkalinity level so that a phenolphthalein titer of 10 ml. samples using 0.1N HCl will remain above about 11 ml. and then gradually increase to no more than about 23 ml.;
   f. after attaining said increased alkalinity level, then adding sufficient $POCl_3$ to decrease the alkalinity to a level at which a 10 ml. sample using 0.1N HCl will give a titer of about 10-13 ml.;
   g. neutralizing said aqueous supension with acid to a pH of about 5-7; and
   h. isolating a granular, crosslinked starch having a hot stage pasting temperature at least 20°F. higher than the granular starch prior to crosslinking, and having an alkali fluidity for a 20 gm. dry substance sample in 70 ml. of 2N NaOH of 75 ml. or higher.

18. The crosslinked granular starch made by the method of claim 17, in which the alkali is NaOH, and about 12-14% NaOH, based on the weight of the starch dry substance, is added simultaneously but separately with about 4% $POCl_3$ based on the weight of the starch dry substance.

19. The crosslinked granular starch of claim 17, in which the starch is a cereal starch selected from the group consisting of starches derived from cereal grains including wheat, rye, rice, waxy rice, barley, oats, milo, waxy milo, corn, genetic varieties of corn including waxy maize and high amylose corn; varieties of pea, including field pea and wrinkled pea, arrowroot, potato, sweet potato, sago, tapioca and taro.

20. A crosslinked granular wheat starch made according to the method of claim 10.

21. A crosslinked granular wheat starch product having a hot stage pasting temperature of about 160°F., said wheat starch product being derived from a granular wheat starch having a hot stage pasting temperature of about 138°F. and being made by the method set forth in claim 10.

22. The wheat starch product of claim 21, in which the initial granular wheat starch consists essentially of large granules ranging from 12 to 40 microns.

23. A phosphorus oxychloride crosslinked starch in granule form having a pasting temperature at least 20°F. higher than the pasting temperature of the starch prior to crosslinking, said starch being made by preparing a suspension of said granular starch in water at a temperature below about 95°F., adding sodium hydroxide to said suspension in an amount sufficient to obtain a pH of about 11.5 to 11.7, adding a minor amount of phosphorus oxychloride to said suspension to initiate crosslinking of said granular starch, allowing said crosslinking to continue for about one-half hour, readjusting the pH of said suspension up to about 11.5 to 11.9 with sodium hydroxide, then simultaneously but separately adding phosphorus oxychloride and sodium hydroxide in amounts to maintain the pH of said suspension in the range of about 11.5 to 11.7, and permitting the crosslinking reaction to continue for about 2½ hours at a temperature below about 90°F. to obtain a crosslinked granular starch having a pasting temperature about 20°F. higher than the original pasting temperature of said granular starch.

24. The crosslinked cereal starch of claim 23 in which the cereal starch is derived from the group consisting of corn, waxy maize, wheat, sorghum, rice, rye and barley.

25. The crosslinked cereal starch of claim 23 in which the starch is prime grade wheat starch and the pasting temperature is raised from about 138°F. to about 162°F. by means of $POCl_3$ crosslinking the starch.

26. The crosslinked cereal starch of claim 25 in which the wheat starch granules have been subjected to hydrocyclone separation so that substantially all granules are in the range of 12 to 40 microns in size.

27. The crosslinked cereal starch of claim 26 in which at least 22% of the granules are at least 22 microns in size.

28. A method of increasing the pasting temperature of a granular cereal starch approximately 20°F., the steps comprising preparing a suspension of said granular cereal starch in water at a temperature below about 95°F., adding sodium hydroxide to said suspension in an amount sufficient to obtain a pH of about 11.5 to 11.7, adding a minor amount of phosphorus oxychloride to said suspension to initiate crosslinking of said granular cereal starch, allowing said crosslinking to continue for about ½ hour, readjusting the pH of said suspension up to about 11.5 to 11.9 with sodium hydroxide, then simultaneously but separately adding phosphorus oxychloride and sodium hydroxide in amounts to maintain the pH of said suspension in the range of about 11.5 to 11.7, and permitting the crosslinking reaction to continue for about 2½ hours at a temperature below about 90°F. to obtain a crosslinked granular cereal starch having a pasting temperature about 20°F. higher than the original pasting temperature of said granular cereal starch.

29. The method of claim 28, in which the granular cereal starch is taken from the group consisting of corn, waxy maize, sorghum, rice, wheat, rye and barley starches.

30. The method of claim 28, in which the granular cereal starch is prime grade wheat starch.

31. The method of claim 30, in which the wheat starch comprises granules ranging in size from 12 to 40 microns.

32. A method of crosslinking a granular starch to increase the gelatinization temperature, the steps comprising:
   a. preparing an aqueous suspension of said starch at a temperature below about 100°F.;
   b. adding sufficient aqueous alkali to said suspension to raise the phenolphthalein titer for a 10 ml. sample to said suspension using 0.1N HCl to about 10–12 ml., at which point the sample is observed to change from reddish to clear;
   c. then adding about 1% $POCl_3$ based on the starch dry substance weight to initially crosslink a portion of said starch, continuing said crosslinking reaction until the phenolphthalein titer of a 10 ml. sample of said reaction mixture suspension using 0.1N HCl remains constant on two successive samplings;
   d. next adding sufficient alkali to increase the phenolphthalein titer for a 10 ml. sample using 0.1N HCl up to 11–13 ml.;
   e. then adding about 4% $POCl_3$ based on the weight of the starch dry substance while simultaneously but separately adding sufficient alkali based on the weight of the starch dry substance and simultaneously monitoring the alkalinity of said aqueous suspension by phenolphthalein titer of 10 ml. samples using 0.1N HCl and controlling the addition of alkali to first maintain the titer above about 11 ml. and then gradually increase the titer to about 20–23 ml.;
   f. after attaining said titer level of about 20–23 ml., then adding about 1% $POCl_3$ based on the weight of the starch dry substance to decrease the titer level to about 10–13 ml.; and
   g. isolating a granular, crosslinked starch having a hot stage pasting temperature at least 20°F. higher than the granular starch prior to crosslinking, and having an alkali fluidity for a 20 gm. dry substance sample in 70 ml. of 2N NaOH of 75 ml. or higher.

33. The method of claim 32, in which the alkali is NaOH, the starch is a large granule wheat starch having granule sizes ranging from 12 to 40 microns, and the initial hot stage pasting temperature of the granular starch is about 138°F. and the hot stage pasting temperature of the crosslinked granular starch is about 160°F.

34. The method of claim 32, in which the granular starch is selected from the group consisting of size classified wheat, rye and barley starches having granule sizes ranging from 12–40 microns.

35. The method of claim 32, in which the granular starch is prime grade, size classified wheat starch having substantially all granules in the size range of 12 to 40 microns, and at least 22% of the granules are at least 22 microns in size.

36. The method of claim 32, including the step of adding sufficient alkali to raise the phenolphthalein titer to about 16–18 ml. and then adding an additional 1% $POCl_3$ based on the weight of the starch dry substance to obtain additional crosslinking and further increase the hot stage pasting temperature of said crosslinked granular starch.

37. The method of claim 32, in which the alkali is NaOH, and about 12–14% NaOH, based on the weight of the starch dry substance, is added simultaneously but separately with about 4% $POCl_3$ based on the weight of the starch dry substance.

38. The method of claim 36, in which the alkali is NaOH, and about 1.8% NaOH is added based on the weight of the starch, dry substance.

39. A crosslinked granular starch having a pasting temperature at least 20°F. higher than the pasting temperature of the starch prior to crosslinking, said starch being obtained by:
  a. preparing an aqueous suspension of said starch at a temperature below about 100°F.;
  b. adding sufficient aqueous alkali to said suspension to raise the phenolphthalein titer for a 10 ml. sample to said suspension using 0.1N HCl to about 10–12 ml., at which point the sample is observed to change from reddish to clear;
  c. then adding about 1% $POCl_3$ based on the starch dry substance weight to initially crosslink a portion of said starch, continuing said crosslinking reaction until the phenolphthalein titer of a 10 ml. sample of said reaction mixture suspension using 0.1N HCl remains constant on two successive samplings;
  d. next adding sufficient alkali to increase the phenolphthalein titer for a 10 ml. sample using 0.1N HCl up to 11–13 ml.;
  e. then adding about 4% $POCl_3$ based on the weight of the starch dry substance while simultaneously but separately adding sufficient alkali based on the weight of the starch dry substance and simultaneously monitoring the alkalinity of said aqueous suspension by phenolphthalein titer of 10 ml. samples using 0.1N HCl and controlling the addition of alkali to first maintain the titer above about 11 ml. and then gradually increase the titer to about 20–23 ml.;
  f. After attaining said titer level of about 20–23 ml., then adding about 1% $POCl_3$ based on the weight of the starch dry substance to decrease the titer level to about 10–13 ml.; and
  g. isolating a granular, crosslinked starch having a hot stage pasting temperature at least 20°F. higher than the granular starch prior to crosslinking, and having an alkali fluidity for a 20 gm. dry substance a sample in 70 ml. of 2N NaOH of 75 ml. or higher.

40. The crosslinked granular starch made by the method of claim 39, in which the alkali is NaOH, and about 12–14% NaOH, based on the weight of the starch dry substance, is added simultaneously but separately with about 4% $POCl_3$ based on the weight of the starch dry substance.

41. The crosslinked granular starch of claim 39, in which the starch is a cereal starch selected from the group consisting of corn, waxy maize, wheat, sorghum, rice, rye and barley.

42. A crosslinked granular wheat starch made according to the method of claim 32.

43. A crosslinked granular wheat starch product having a hot stage pasting temperature of about 160°F., said wheat starch product being derived from a granular wheat starch having a hot stage pasting temperature of about 138°F. and being made by the method set forth in claim 32.

44. The wheat starch product of claim 43, in which the initial granular wheat starch consists essentially of large granules ranging from 12 to 40 microns.

* * * * *